United States Patent [19]

Aschberger

[11] Patent Number: 4,758,688
[45] Date of Patent: Jul. 19, 1988

[54] WALL DUCTS THROUGH WALLS OF PRESSURE VESSELS

[75] Inventor: Matthias Aschberger, Giengen, Fed. Rep. of Germany

[73] Assignees: The Coca-Cola Company, Atlanta, Ga.; Bosch-Siemens Hausgeräte GmbH, Munich, Fed. Rep. of Germany

[21] Appl. No.: 930,057

[22] Filed: Nov. 12, 1986

Related U.S. Application Data

[63] Continuation of Ser. No. 768,366, Aug. 22, 1985, abandoned.

[30] Foreign Application Priority Data

Aug. 22, 1984 [DE] Fed. Rep. of Germany ....... 3430902

[51] Int. Cl.⁴ .................... F16L 17/00; F16L 41/08; H01B 17/40; H01B 17/58
[52] U.S. Cl. .................... 174/153 G; 277/12; 277/168; 174/153 R; 285/95; 285/205; 285/325; 285/347; 374/208
[58] Field of Search ............. 277/2, 12, 168; 285/201, 202, 203, 204, 325, 205, 347, 93, 158, 159, 95, 113, 189; 174/153 R, 142, 153 G, 175; 248/56; 374/208; 251/900

[56] References Cited

U.S. PATENT DOCUMENTS

| | | | |
|---|---|---|---|
| 1,056,392 | 3/1913 | Barr et al. | 174/153 G |
| 1,251,416 | 12/1917 | Parkey | 174/175 |
| 2,178,697 | 11/1939 | Oestreicher | 374/208 |
| 2,431,154 | 11/1947 | Wikstrom | 285/201 X |
| 2,564,938 | 8/1951 | Warren | 285/95 |
| 2,786,643 | 3/1957 | Carlstedt | 285/201 X |
| 2,814,508 | 11/1957 | Seamark | 285/95 |
| 2,889,089 | 6/1959 | Herrick et al. | 285/205 X |
| 2,935,343 | 5/1960 | Ellis | 285/95 |
| 2,958,548 | 11/1960 | De Viennt et al. | 285/215 X |
| 3,231,300 | 1/1966 | Moroney | 174/153 G X |
| 3,342,366 | 9/1967 | Defauw | 285/202 X |
| 3,560,027 | 2/1971 | Graham | 285/201 X |
| 3,708,612 | 1/1973 | Saxon et al. | 174/153 R X |
| 3,845,661 | 11/1974 | Hollweck et al. | 374/208 |
| 4,346,863 | 8/1982 | Zeitrager et al. | 248/56 |
| 4,407,042 | 10/1983 | Schramme et al. | 174/153 G X |

Primary Examiner—Allan N. Shoap
Attorney, Agent, or Firm—Birch, Stewart, Kolasch, & Birch

[57] ABSTRACT

A wall duct assembly for a high pressure storage vessel, such as the carbonator tank of a beverage dispenser, includes a cylindrical ring formed in a wall area of the vessel having an inner surface defining an opening in the vessel, a wall duct bushing in the opening having a flange for sealingly engaging the interior wall of the vessel around the opening, an annular groove in the bushing opening towards the inner surface of the cylindrical ring and a sealing gasket in the groove. The wall duct bushing also has an annular bore through which electrical lines or other conduits may pass to the interior of the vessel.

1 Claim, 3 Drawing Sheets

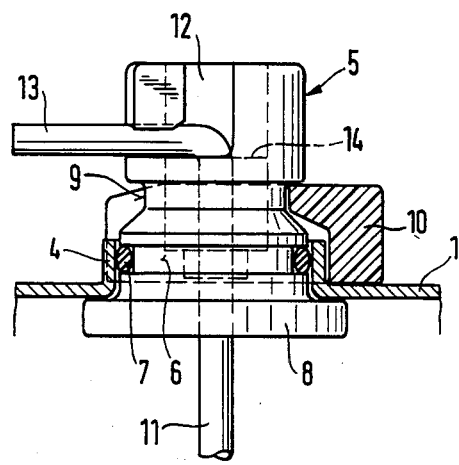
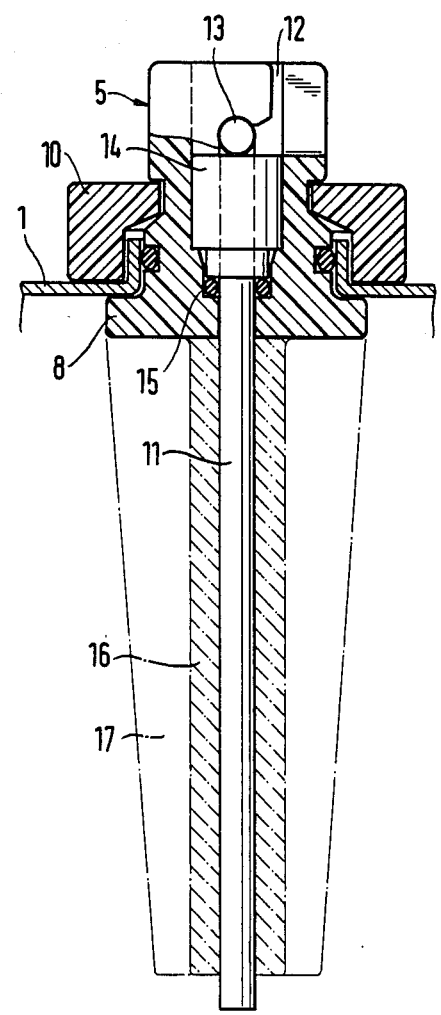
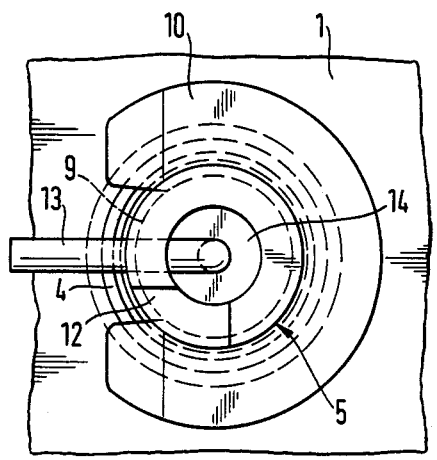

WALL DUCTS THROUGH WALLS OF PRESSURE VESSELS

This application is a contination of application Ser. No. 768,366 filed on Aug. 22, 1985, now abandoned.

BACKGROUND OF THE INVENTION

The invention relates to a wall duct assembly passing through walls of storage vessels subjected to a high internal pressure, more particularly, storage vessels for the carbonization of water in beverage dispensers.

For example, storage vessels are employed for use in beverage dispensers in which fresh water, supplied as required, is enriched under a high gas pressure with $CO_2$ gas, which is also supplied. To promote the carbonization process and to obtain a pleasantly cool refreshing drink after mixture of the carbonized water with a beverage concentrate, it is at least expedient to chill the storage vessel. To monitor the liquid level in the storage vessel as well as to detect the cooling condition, sensors must be provided in the storage vessel. With proper connections through the vessel, they can be connected to an evaluation circuit. In addition to the outlet opening for the carbonized water, it may also be necessary to provide another wall duct for connecting cables from which, for example, a circulation pump inside the storage vessel is supplied with current.

The specification shows that a number of wall ducts are necessary for the storage vessel. Particularly, since the storage vessel is subjected to a high internal pressure, it is very important that these wall ducts be designed such as to be impervious to both liquids and gases.

In principle, gastight wall ducts are sufficiently well known. Thus, for example, it is possible to pot, solder, or grout the wall duct openings, to provide conical flanges, or to take positive-engagement steps by means of pressed-on sealing materials. Particularly in view of the multitude of bushings required for a storage vessel, a relatively great amount of time and effort goes into the manufacture of wall ducts that are impervious to water and gases made in accordance with known techniques. Since the storage vessel may also be continuously subjected to heat fluctuations which, due to the various heat expansion coefficients of the parts used, produce stresses and loads in the area of the wall ducts, some of the prior art techniques have not stood the test of time.

SUMMARY OF THE INVENTION

Therefore, the primary object of the invention is to provide wall ducts through walls of storage vessels subjected to a high internal pressure that can be used many times, are easy to manufacture, and are functionally reliable under the prevailing loads.

According to the invention, a wall duct that meets the above requirements is characterized by the fact that the storage-vessel wall in the area of the wall duct is designed as a wall ring with a substantially cylindrical inner-wall section, and that a wall duct section traversing this wall ring has in the area of the vessel interior a flange that covers the wall duct opening through the pressure-vessel wall, and in an annular groove within the cylindrical wall duct opening a seal ring that abuts against the inner wall of this wall duct opening.

A wall duct designed in accordance with these teachings requires in the storage vessel only wall duct openings with substantially cylindrical inner-wall sections. The wall duct section in the area of this cylindrical inner-wall section also has a cylindrical shape, that is to say, it has a diameter that is slightly smaller than that of the wall duct opening. Thus, the wall duct section can easily be inserted into the wall duct opening in the wall of the storage vessel. The wall duct section carries on the end turned toward the interior of the storage vessel a flange which is larger than the wall duct opening, so that the wall duct section can be pushed into the wall duct opening only until it abuts against this flange. This area need not be sealed off. The seal ring arranged in accordance with the principles of the invention in an annular groove in the cylindrical section of the wall duct section is used for the sealing to prevent the entry of liquids and gases. After the wall duct section abuts reliably, from the mechanical point of view, with its flange or flange sections against the inner wall of the storage vessel as a result of the high pressure in the vessel interior, this high internal pressure in the cylindrical gap between wall duct section and wall duct opening causes the seal ring to deform sufficiently so as to allow it to abut gas- and liquid-tight against the wall duct section and wall duct opening. When the high internal pressure is reduced to normal atmospheric pressure, the load on the seal ring is taken off so that it is also possible to replace the wall duct section with ease.

According to a preferred embodiment of the wall duct of the invention, the wall duct section is made of plastic. Thus, conditions are propitious for mass production. Due to the steps advocated by the invention, differences between temperature/expansion coefficients do not have a deleterious effect on the pressure vessel. Also, no problems need be considered with regard to adhesive capacity or castability.

According to another preferred embodiment, the wall duct incorporating the invention is characterized by the fact that the wall duct section in the duct opening of the storage-vessel wall is locked against axial movement by a U-shaped ring-section plate outside the storage vessel which is pushed up radially into another annular groove. This ring-section plate pushed into the annular groove of the wall duct section is to be safeguarded against the possibility that, due to loads applied from the outside, the wall duct section will be pushed into the storage vessel against the internal pressure prevailing therein. However, the ring-section plate is also used as a mounting aid. Otherwise, this annular plate ensures that the operating position of the wall duct section in the wall duct opening in the storage-vessel wall will be maintained and that the seal ring can properly perform its sealing function.

According to another embodiment, the novel wall duct for electric lines is characterized by the fact that the electric lines, designed with a cylindrical cross section, traverse an axial bore through the wall duct section, accompanied by the clamping of a seal ring in the axial direction for radial abutment against the external diameter of the electric line and against the internal diameter of a bore section of the wall duct section, which is flared in this area so as to provide mechanical clamping in the wall duct for the electric line as well as a reliable sealing to prevent liquids and gases from entering.

In order to pass through sensors as electric connections, it is of advantage to design the novel wall duct in such a way that the sensor takes on the shaped of a rod bent aside in the form of an L and has a cylindrical cross section, that the sensor traverses the wall duct section with one limb through the axial bore, and that it is clamped with the wall duct section with its other limb in the manner of a bayonet joint, accompanied by the axial clamping of a seal ring for abutment against the internal diameter of a bore section of the wall duct section which is flared in this area and against the external diameter of the sensor limb passing therethrough. To clamp the seal ring, a bushing is provided in the wall duct section. Such sensors are used to determine the liquid level in the storage vessel or to detect temperatures or the formation of ice.

In sensors designed to detect the formation of ice in the storage vessel, there is a risk that they will be bent out of shape by the ice formed, particularly if they project relatively deeply into the storage vessel. To prevent the sensor from being deleteriously affected, it is advisable to give the wall duct section a cellular configuration with a part extending into the interior of the storage vessel.

BRIEF DESCRIPTION OF DRAWINGS

Specific embodiments designed in accordance with the features of the invention will now be described with reference to the accompanying drawing, in which:

FIG. 3 is a first side view of a wall duct section through this storage vesel,

FIG. 4 is a second side view of this wall duct section,

FIG. 5 is a top plan view of this wall duct section, and

DESCRIPTION OF PREFERRED EMBODIMENTS

Figure 1:
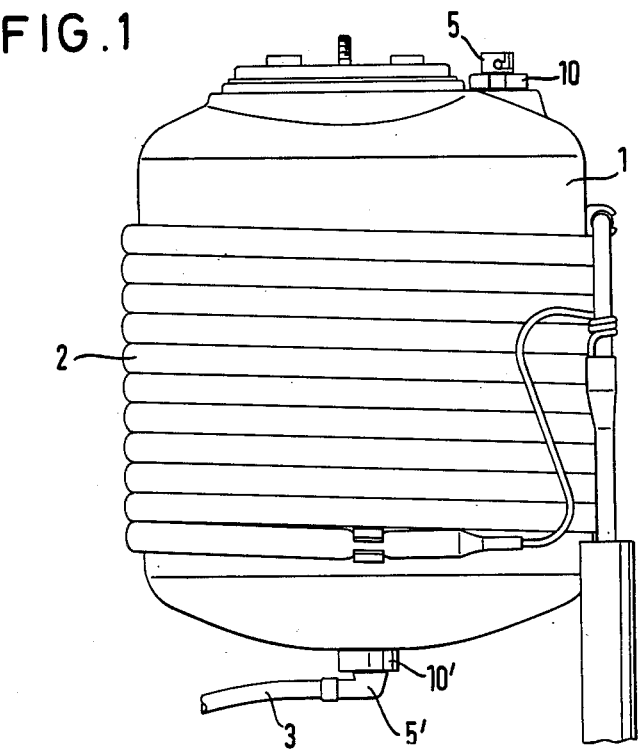
FIG. 1 is a side view of a storage vessel.
Figure 2:
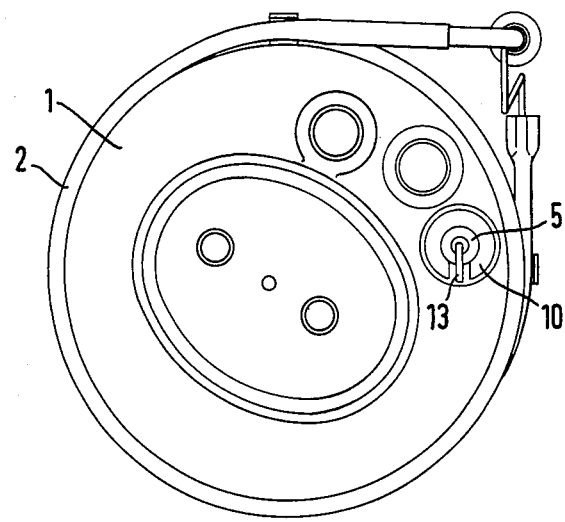
FIG. 2 is a top plan view of this storage vessel.

The storage vessel 1 depicted in FIGS. 1 and 2 serves as a carbonizing tank for beverage dispensers. Carbonized water is drawn off via a pipe 3 from this carbonizing tank which is chilled by cooling coils 2. Thereupon, this storage vessel must be replenished with fresh water and $CO_2$ gas. In addition, sensors are needed to monitor the liquid level in the storage vessel as well as the formation of an ice layer. If necessary, a circulation pump is also mounted in the storage vessel 1, which must be supplied with a drive current.

For all the purposes described above, it is necessary to provide wall ducts through the wall of the storage vessel 1.

Such a wall duct for a sensor is illustrated in FIGS. 3 to 5. To receive this wall duct, the wall of the storage vessel 1 is drawn outwards to form a cylindrical annular section 4. The wall duct section 5 is inserted into this cylindrical annular section 4. This wall duct section 5 carries in an annular groove 6 within a cylindrical segment a seal ring 7 made of a plastic material and abutting against the external diameter of the annular groove 6 and against the internal diameter of the cylindrical ring section 4 of the storage vessel wall. The wall duct member 5 carries a flange 8 that covers the duct opening in the vessel wall. This flange 8 abuts against the inner wall of the storage vessel. An annular section plate 10 outside the storage vessel 1 engages in another annular groove 9 of the wall duct section 5. This annular section plate 10 holds the wall duct section 5 mechanically in the wall duct opening of the vessel wall. The sealing to prevent the entry of liquids and gases is solely effected by the seal ring 7 which is pressed axially by the pressure applied to the interior of the storage vessel 1 against the outer flange of the annular groove 6 and which is thus in tighter fitting engagement with the inner wall of the cylindrical annular section 4 of the vessel wall, and against the external diameter of the annular groove 6. The annular-section plate 10 is U-shaped so that it can be pushed sideways into the annular groove 9 of the wall duct section 5.

Figure 6:
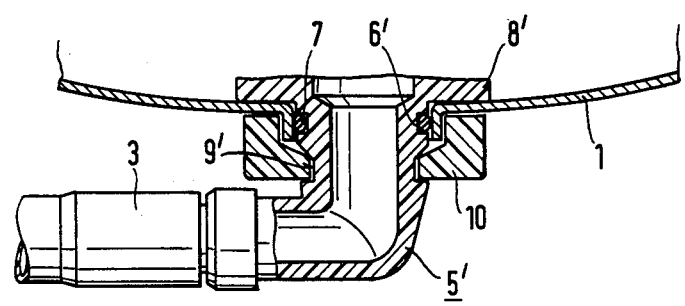
FIG. 6 is a side view of a wall duct section for a liquid supply connection.

In principle, the embodiment depicted in FIG. 6 is provided with all these functional parts. In this case, the wall duct section 5' serves as an inlet connection for a conduit for liquids.

In the system shown in FIGS. 3 to 5, the wall duct section 5 is used to receive a rod-shaped sensor 11 that projects into the interior of the storage vessel 1. To receive the sensor rod 11, the wall duct section 5 has an axial bore with graduated diameters. This sensor rod 11 has an offset L-shaped design so that, through its shape, it can be locked with the wall duct section 5 against axial movement by means of a bayonet-joint-type recess 12 provided therein. In the process, the bent-aside part 13 of the sensor rod 11 acts on a bushing 14, by means of which a seal ring 15 is urged axially in such a way that it seals the sensor rod 11 off from the wall duct section 5 to prevent liquids and gases from entering.

In FIG. 4, an extension piece 16 with stabilization bars 17 is denoted by the dot-dash line. If necessary, this extension piece may be placed on the wall duct section 5 so as to stabilize the sensor 11 projecting into the interior of the storage vessel 1.

We claim:

1. A wall duct assembly to be installed through the walls of storage vessel shaving a relatively high internal pressure as compared to the pressure outside the storage vessel comprising:

a substantially cylindrical ring formed in a wall area of the storage vessel, said ring having an inner wall defining a substantially cylindrical opening through said wall area;

a substantially cylindrical wall duct bushing having a flange for sealingly engaging the interior wall of the storage vessel in all areas contiguous to and surrounding said opening to form a liquid and gas-tight seal when said high internal pressure exceeds a predetermined level, said bushing also having an annular groove opening towards the inner wall of said ring;

a sealing gasket in said annular groove for sealingly engaging the inner wall of said ring to preclude the passage of liquid or gases into the storage vessel around said wall duct bushing; and an axial bore extending through said wall duct bushing, said axial bore having an inboard section with a diameter slightly larger than the diameter of an electric line passing therethrough into the storage vessel and an outboard section having a larger diameter than the inboard section in the provision of a shoulder where the two sections connect, a sealing ring on said shoulder, an inner bushing in said outboard section, means for forcing said inner bushing against said sealing ring to form a liquid and gas-tight seal about said shoulder and said electric line, said electric line being bent in an L-shape with one leg of the L passing through said axial bore and the other leg of said L fitting into a bayonet joint in the outboard end of said wall duct bushing, whereby rotation of said L-shaped line about said one leg in said axial bore causes said other leg to press said inner bushing against said sealing ring.

* * * * *